March 4, 1952     I. I. CAMERON ET AL     2,588,204
JOURNAL BOX AND HYDRAULIC SAFETY VALVE THEREFOR
Filed June 26, 1947     5 Sheets-Sheet 1
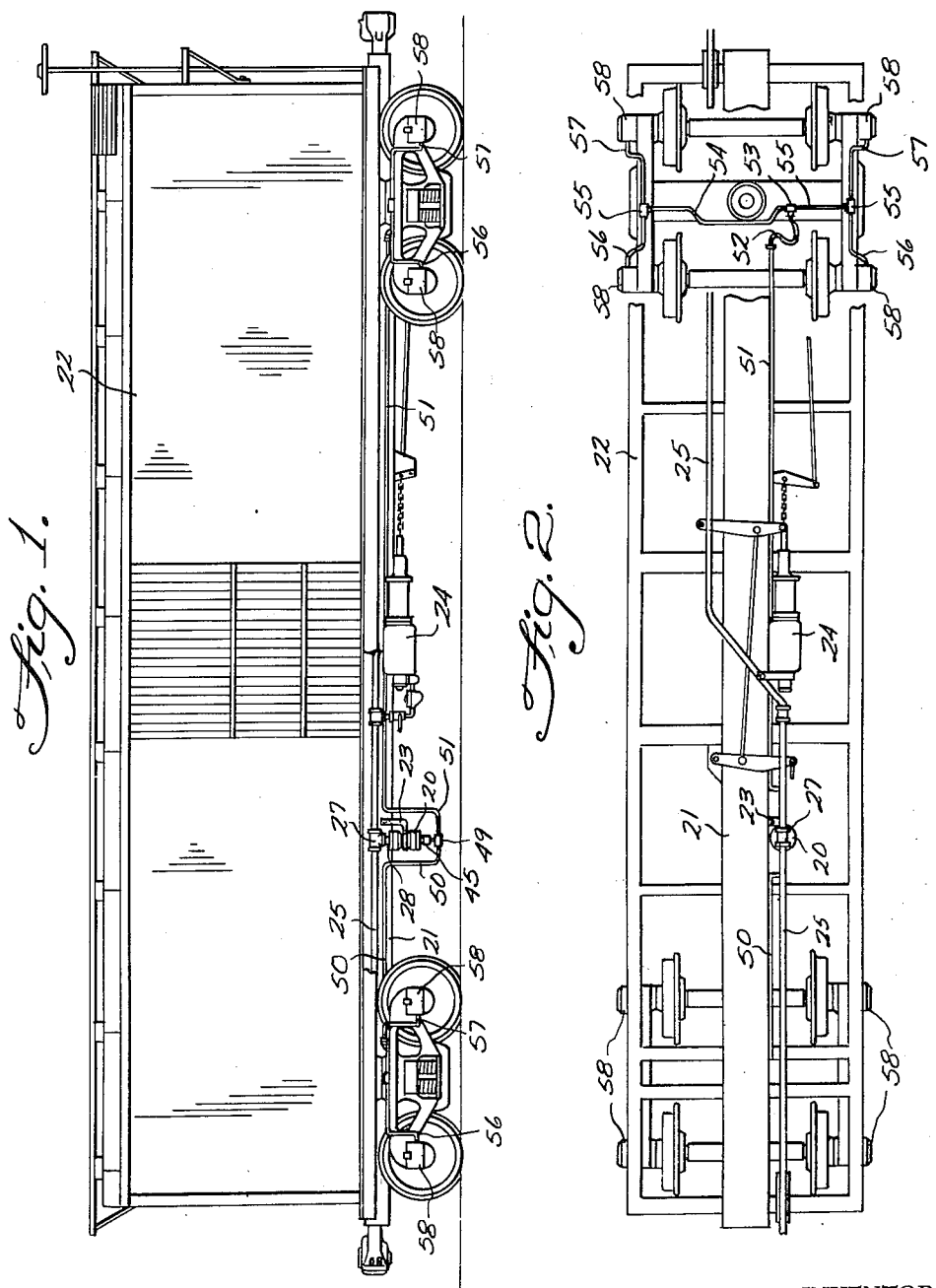
INVENTOR.
Iverson I. Cameron,
Brower C. Spronsy,
BY Victor J. Evans & Co.
ATTORNEYS

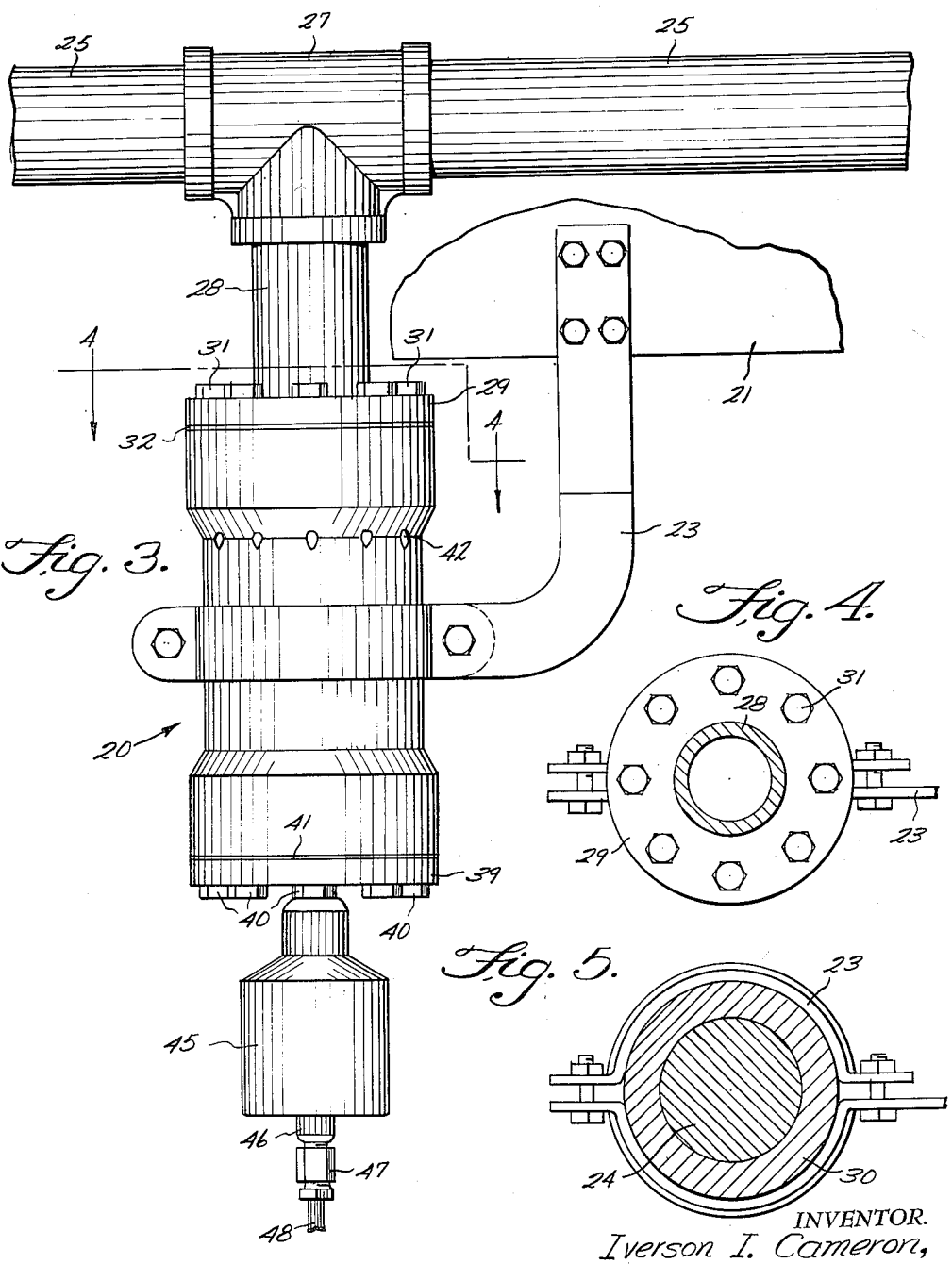

March 4, 1952     I. I. CAMERON ET AL     2,588,204
JOURNAL BOX AND HYDRAULIC SAFETY VALVE THEREFOR
Filed June 26, 1947     5 Sheets-Sheet 3

INVENTOR.
Iverson I. Cameron,
Brower C. Spransy
BY Victor J. Evans & Co.
ATTORNEYS March 4, 1952   I. I. CAMERON ET AL   2,588,204
JOURNAL BOX AND HYDRAULIC SAFETY VALVE THEREFOR
Filed June 26, 1947   5 Sheets-Sheet 4
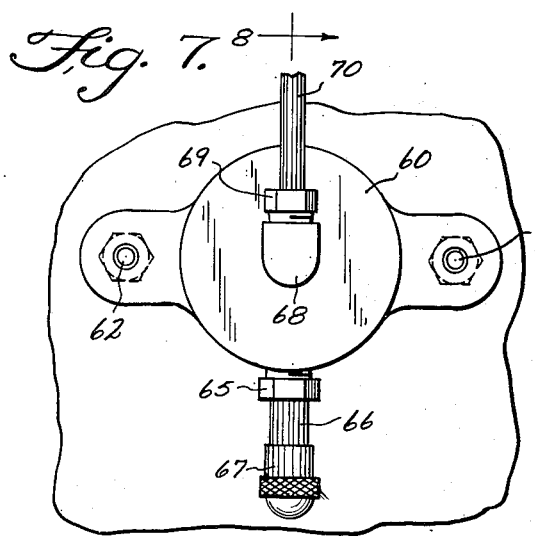
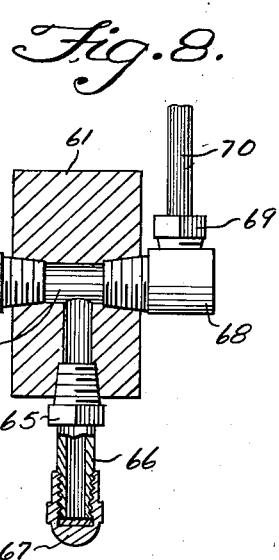
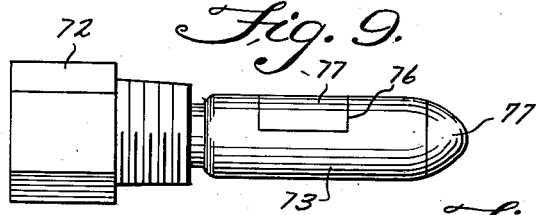
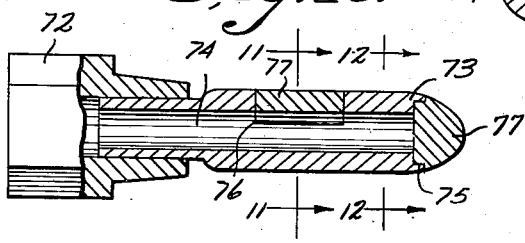
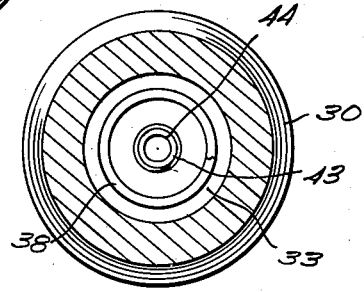
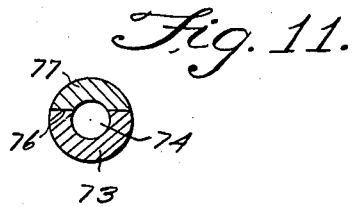
INVENTOR.
Iverson I. Cameron,
Brower C Spransy,
BY Victor J. Evans & Co.
ATTORNEYS March 4, 1952 I. I. CAMERON ET AL 2,588,204
JOURNAL BOX AND HYDRAULIC SAFETY VALVE THEREFOR
Filed June 26, 1947 5 Sheets-Sheet 5
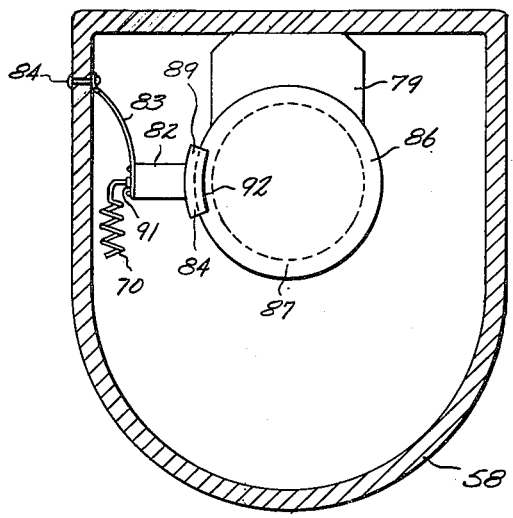
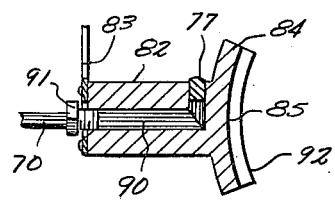
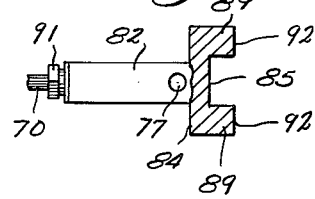
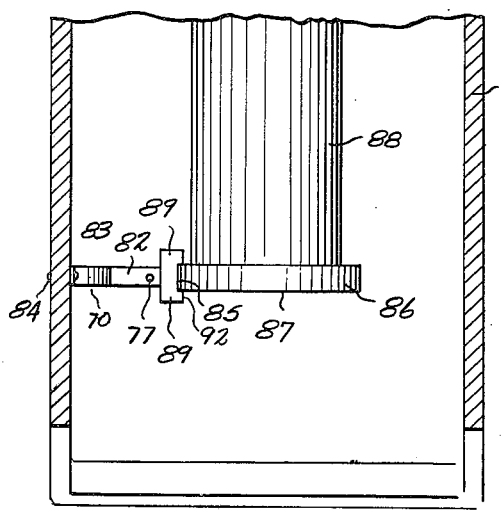
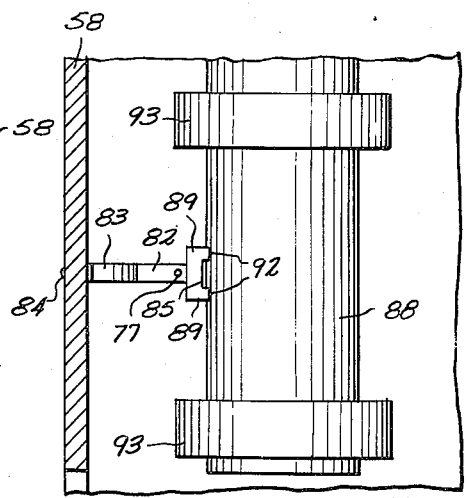
INVENTOR.
Iverson I. Cameron,
Brower C. Spranzy,
BY Victor J. Evans & Co.
ATTORNEYS Patented Mar. 4, 1952

2,588,204

UNITED STATES PATENT OFFICE 2,588,204

JOURNAL BOX AND HYDRAULIC SAFETY VALVE THEREFOR

Iverson I. Cameron and Brower C. Spransy, Alexandria, Va.

Application June 26, 1947, Serial No. 757,214

1 Claim. (Cl. 246—169)

This invention relates to a hydraulic safety valve which is adapted to be connected to the journal box of railroad equipment, and the brake line thereon, to prevent serious damage to the railroad equipment, due to the overheating of the journal box.

An object of the invention is to provide a safety device for railroad equipment, including a hydraulically operated valve which will, upon the overheating of a journal box on the equipment, bleed the brake lines to apply the brakes to prevent serious damage to the equipment as a result of the overheating of the journal box.

Another object of the invention is to provide a heat actuated means which, mounted in contact with the bearing or axle flange of the piece of railroad equipment, serve to actuate a safety valve to bleed the brake line to apply the air brakes before serious damage has occurred to the equipment.

With the above and other objects and advantages in view, the invention consists of the novel details of construction, arrangement and combination of parts more fully hereinafter described, claimed and illustrated in the accompanying drawings in which:

Figure 1 is a side elevational view of a piece of railroad equipment with an embodiment of the invention mounted in position thereon;

Figure 2 is a bottom plan view of the equipment showing the manner in which the device embodying the invention is mounted thereon;

Figure 3 is an elevational view of an embodiment of the invention, per se;

Figure 4 is a sectional view on the line 4—4 of Figure 3;

Figure 5 is a sectional view on the line 5—5 of Figure 6;

Figure 7 is an elevational view of the line connection for the device;

Figure 8 is a sectional view on the line 8—8 of Figure 7;

Figure 9 is an elevational view of the heat actuated means for the journal box;

Figure 10 is a longitudinal sectional view of Figure 9;

Figure 11 is a sectional view on the line 11—11 of Figure 10;

Figure 12 is a sectional view on the line 12—12 of Figure 10;

Figure 13 is a sectional view on the line 13—13 of Figure 6;

Figure 14 is a sectional view on the line 14—14 of Figure 6;

Figure 15 is a vertical sectional view of a hot box showing a modification of the invention positioned therein in contact with the flange of the axle on a piece of railroad equipment;

Figure 16 is a transverse sectional view of Figure 15 showing the device in operation with a single axle flange;

Figure 17 is the same as Figure 16 showing the device in operation between roller bearings on the axle;

Figure 18 is a longitudinal sectional view of the flange contactor and

Figure 19 is a plan view partly in section of the contactor.

Figure 6:
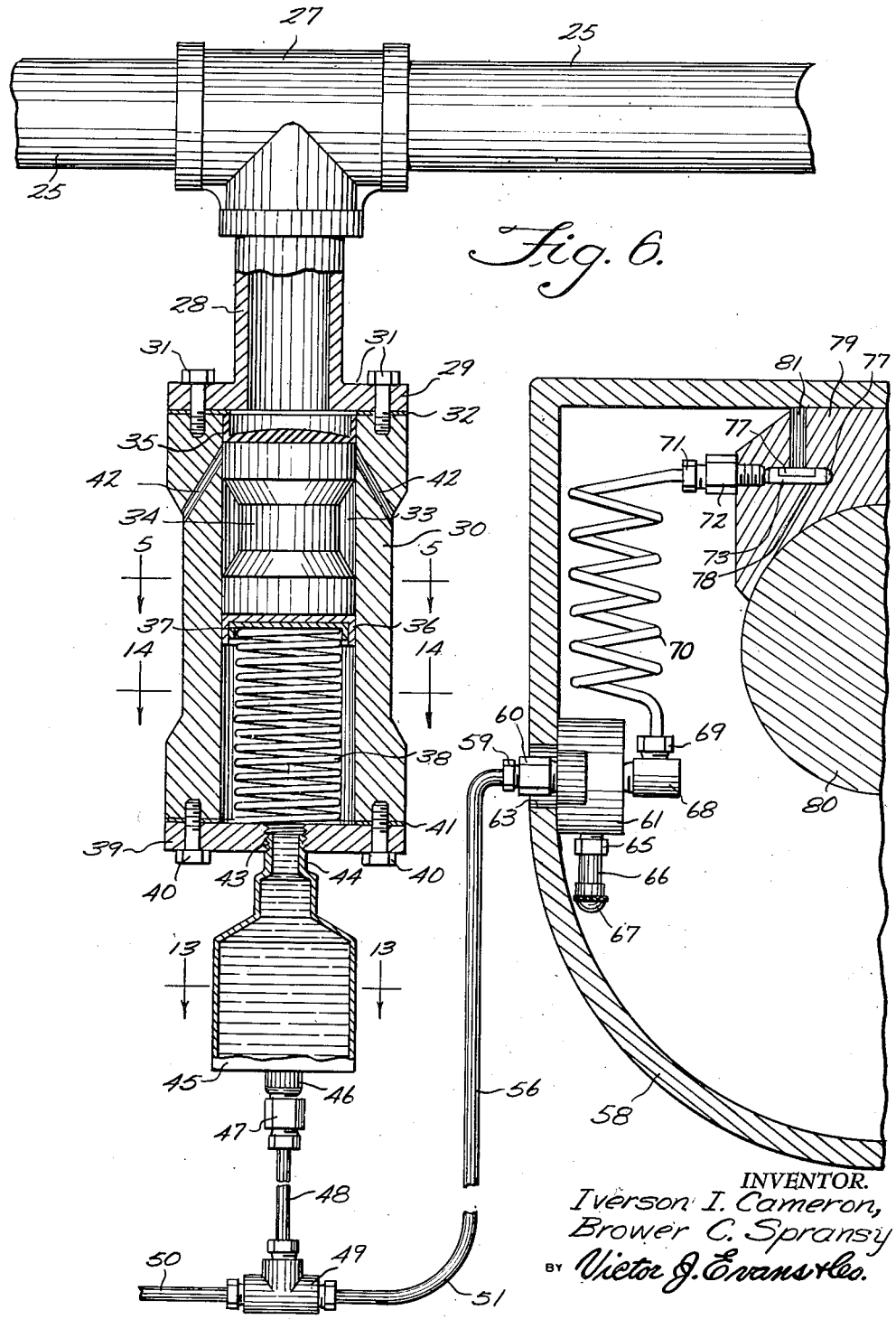
Figure 6 is a vertical sectional view of the device, per se, connected to the brake line shown in elevation, of a piece of railroad equipment on the journal box shown in section of the equipment.

Referring more in detail to the drawings, the numeral 20 generally designates the safety valve embodying the invention which is hydraulically operated, and which will later be more fully described.

The valve 20 is adapted to be secured to the center beam 21 of a piece of railroad equipment 22 by means of the hanger arm 23. The equipment 22 is provided with the conventional brake cylinder 24 and brake lines 25 which operate in the conventional manner.

In mounting the valve 20, a T 27 is interpolated in the line 25 adjacent to the hanger 23 which is so mounted that said connection can be easily made.

Connected to the T 27 in the conventional manner is the tubular conduit 28 which is formed integral with the cover 29 removably connected to the valve housing 30 of the valve 20 by screw bolts 31, a ring gasket 32 interposed between the two providing a fluid tight seal.

The casing has a central bore 33 communicating with the conduit 28 in which is mounted the reciprocating piston 34 which contacts at its upper end the deformable cup washer 35 and at its lower end the deformable cup washer 36. Mounted with the washer 36 is a cup-shaped metal disc 37 which engages the upper end of the coil expansion spring 38 which, at its lower end, engages the bottom 39 of the valve which is secured to the casing 30 by screw bolts 40 and interposed between these two is a ring gasket 41, providing a fluid tight seal. Adjacent the upper end of the housing 30 are provided a plurality of relatively spaced downwardly inclined escape vents 42, the purpose of which will be later explained.

The bottom 39 is centrally tapped at 43 to receive the threaded end 44 of the fluid reservoir 45 which has a centrally located outlet 46 in the top thereof to receive a coupling 47 which connects the conduit 48 thereto. The conduit 48 is connected to a distributing T 49 which has a plurality of conduits 50 and 51 connected thereto. These conduits extend to the forward and read end of the equipment 22 to be connected to a flexible conduit 52 which is connected to a distributing T 53 which, by means of conduits 54 and 55, respectively, are connected to the distributing T's 55 which, by means of conduits 56 and 57, are connected to the journal box 58 of the equipment 20.

Each of the conduits 56 and 57 has a coupling 59 on the free end thereof, which is connected to the coupling 60 threadably connected to the line connector 61 which is secured to the inner side of the journal box 58 by screw bolts 62, the coupling 60 entering through the opening 63 in the journal box. The connector 61 has a T-shaped passageway 64 therein, which receives the coupling 60, the coupling 65 having an air or fluid pressure inlet valve 66 connected thereto, which has a dust cap 67 hereon, and the coupling 68 which, by coupling 69, is connected to the helically coiled conduit 70. This coil is so formed as to compensate for any vibration that will exist between its coupling end 69 and its coupling end 71 which is connected to the coupling 72 of the heat actuated cartridge 73. The cartridge 73 has a central bore 74 having an open end 75 and an opening 76 in its longitudinal wall and the end and opening are closed by heat affected material 77. The cartridge 73 and the coupling 72 are inserted into a cavity 78 in the axle bearing 79 which conventionally engages the axle 80 and an outlet port 81 in the bearing 79 communicates with the cavity 78 in which the cartridge is mounted.

In operation with the device mounted as shown in Figure 6, fluid under pressure is introduced into the reservoir 45 through the value 66, connector 61 and the plurality of conduits connecting the reservoir and connector. Each journal box will have a connector to properly distribute the pressure as desired.

The pressure built up in the reservoir and the pressure built up within the housing 30, together with the force of expansion of the spring 38 will be greater than the air pressure in the line 25, which under normal circumstances is tending to force the piston 34 downwardly within the housing 30.

Under normal conditions with both pressures equalized, the valve is in normal or inoperative position, but should the bearing 79 become overheated, the material 77 will melt, allowing the pressure in the conduits to escape through the outlet port 81. With the pressure on the underside of the piston 34 reduced, the pressure of the brake lines 25 will force the piston downwardly and permit the air in the lines to escape through vents 42 which, under normal conditions, are closed by the piston 34 to bleed the lines and set the brakes to prevent damage to the equipment.

In Figures 15 and 16, there is shown a modified form of the invention, wherein a rider or sliding contact 82 is mounted on one end of a leaf spring 83 which is fixed at 84 to the journal box 58. The contact 82 has a curved trackway 84 at its free end which has a central curved face 85 which engages the periphery 86 of the flange 87 of the axle 88 while the outer flanges 89 ride on opposite sides of the flange 87, see Figure 16. The pressure of the spring 83 retains the face 85 of the trackway 84 in contact with the periphery 86 of the axle flange 87 under normal conditions at all times. The contact 82 has the central L-shaped bore 90 which is open at one end to receive a coupling 91 for connection to the conduit 70, while the other opened end is closed by the material 77. Should the axle 88 be mounted in tapered or straight roller bearings 93, as shown in Figure 17, the curved face 92 of the flanges 89 will engage the axle 88 intermediate of the bearings 93.

The modifications shown in Figures 15 to 19, inclusive, operate in the same manner as previously described, except that it is the heat of the axle 88, rather than the heat of the bearing 79, that causes the melting of the material 77.

There has thus been provided a safety system for railroad equipment that, having a hydraulically operated valve mounted therein, will, upon overheating of the journal box of the equipment, set the brakes to prevent serious damage to the equipment.

It is believed that the operation and construction of the device will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

Apparatus for detecting overheating of a journal box comprising a valve including a casing and a piston in said casing, deformable cup washers in said casing at opposite ends of said piston valve, spring means in said casing in engagement with one of said deformable cup washers and urging said washer and piston toward one end of said casing, air vents in said casing adjacent one end thereof, and normally closed by said piston, means for connecting said casing to the air brake lines of railroad equipment, means for connecting the valve to the journal box of said equipment, said connecting means comprising a fluid reservoir connected to said valve, a flexible conduit connected to said reservoir, a line connector connected to the conduit and mounted in the journal box, a helically coiled conduit connected to said connector and to an axle bearing, air under pressure in said first named means normally insufficient to shift the piston from normal position, resulting from combined spring and fluid pressure at the opposite end of the piston, and a solidified actuating material in said coiled conduit adapted to be liquified upon excessive heating of the journal bearing, whereby to permit the fluid pressure to be reduced and the piston to shift under air pressure and bleed the air brake lines through the vents for a brake application.

IVERSON I. CAMERON.
BROWER C. SPRANSY.

REFERENCES CITED

The following references are of record in the file of this patent:

UNITED STATES PATENTS

| Number | Name | Date |
|---|---|---|
| 893,605 | Brill | July 21, 1908 |
| 950,726 | Miller | Mar. 1, 1910 |
| 1,187,693 | Woolley | June 20, 1916 |
| 1,270,954 | Jordan et al. | July 2, 1918 |
| 1,544,390 | Harris | June 30, 1925 |
| 1,665,651 | Youngblood | Apr. 10, 1928 |
| 1,690,050 | Blair | Oct. 30, 1928 |
| 2,114,762 | Edmonds | Apr. 19, 1938 |
| 2,187,958 | Vigne et al. | Jan. 23, 1940 |
| 2,400,399 | Down et al. | May 14, 1946 |
| 2,428,720 | Nicholas | Oct. 7, 1947 |
| 2,464,985 | McCune | Mar. 22, 1949 |